US011811257B2

(12) United States Patent
Cassarino et al.

(10) Patent No.: US 11,811,257 B2
(45) Date of Patent: Nov. 7, 2023

(54) METHOD FOR CONTROLLING A POWER SUPPLY DEVICE OF AN ELECTRICAL SYSTEM

(71) Applicant: COMMISSARIAT A L'ENERGIE ATOMIQUE ET AUX ENERGIES ALTERNATIVES, Paris (FR)

(72) Inventors: Leandro Cassarino, Grenoble (FR); Sylvain Bacquet, Grenoble (FR); Ghislain Despesse, Grenoble (FR); Eric Fernandez, Grenoble (FR); Yan Lopez, Grenoble (FR); Remy Thomas, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 358 days.

(21) Appl. No.: 17/272,044

(22) PCT Filed: Aug. 19, 2019

(86) PCT No.: PCT/FR2019/051935
§ 371 (c)(1),
(2) Date: Feb. 26, 2021

(87) PCT Pub. No.: WO2020/049237
PCT Pub. Date: Mar. 12, 2020

(65) Prior Publication Data
US 2021/0351606 A1    Nov. 11, 2021

(30) Foreign Application Priority Data

Sep. 3, 2018 (FR) ...................... 1857883

(51) Int. Cl.
H02J 7/00 (2006.01)
H02J 7/14 (2006.01)
(Continued)

(52) U.S. Cl.
CPC ............ *H02J 7/1423* (2013.01); *B60L 58/12* (2019.02); *B60L 58/16* (2019.02); *B60L 58/24* (2019.02);
(Continued)

(58) Field of Classification Search
CPC ....... H02J 7/1423; H02J 7/0047; B60L 58/12; B60L 58/16; B60L 58/24;
(Continued)

(56) References Cited

U.S. PATENT DOCUMENTS 6,058,032 A     5/2000  Yamanaka et al.
2014/0167515 A1 6/2014  Feuerstack et al.
(Continued)

OTHER PUBLICATIONS

International Search Report dated Nov. 13, 2019 in PCT/FR2019/051935 filed on Aug. 19, 2019, 3 pages.

*Primary Examiner* — Zixuan Zhou
(74) *Attorney, Agent, or Firm* — Oblon, McClelland, Maier & Neustadt, L.L.P.

(57) ABSTRACT

A method for controlling a power supply device of an electrical system, the device including at least one separate power supply assembly per phase of the electrical system, each power supply assembly including at least one battery pack defined by a state parameter and provided with at least one battery to supply a control voltage to the phase to which it is connected, taking into account at least one setpoint value. The method includes executing at least one correction block receiving as input each setpoint value and the state parameter of each battery pack of the power supply assemblies of the system, and for each power supply assembly, the correction block is configured to determine a correction value to be applied directly or indirectly to its setpoint value.

15 Claims, 15 Drawing Sheets

(51) Int. Cl.
  *B60L 58/12*   (2019.01)
  *B60L 58/16*   (2019.01)
  *B60L 58/24*   (2019.01)
  *H02M 7/44*   (2006.01)
  *H02M 7/5395*   (2006.01)
  *B60L 53/20*   (2019.01)
  *H02P 27/06*   (2006.01)

(52) U.S. Cl.
  CPC .............. *H02J 7/0047* (2013.01); *H02M 7/44* (2013.01); *H02M 7/5395* (2013.01); *B60L 53/20* (2019.02); *B60L 2210/40* (2013.01); *B60L 2240/545* (2013.01); *B60L 2240/547* (2013.01); *H02P 27/06* (2013.01)

(58) Field of Classification Search
  CPC ......... B60L 2240/545; B60L 2240/547; B60L 53/20; H02M 7/44; H02M 7/5395; H02P 27/06
  USPC .............................................. 320/109; 701/22
  See application file for complete search history.

(56) References Cited

U.S. PATENT DOCUMENTS

| | | |
|---|---|---|
| 2016/0261123 A1 | 9/2016 | Rapp |
| 2017/0254858 A1* | 9/2017 | Weicker ............. G01R 31/3648 |
| 2018/0105059 A1* | 4/2018 | Namou ............. G01R 31/3271 |

* cited by examiner

METHOD FOR CONTROLLING A POWER SUPPLY DEVICE OF AN ELECTRICAL SYSTEM

TECHNICAL FIELD OF THE INVENTION

The present invention relates to a control method for controlling an electric-power-supply device for supplying electric power to an electrical system and to a control system for controlling said electric-power-supply device.

PRIOR ART

It is known to supply power to a system such as an electric machine, for example an electric motor used in an electric vehicle, using a battery pack. With reference to FIG. 1, the battery pack BATT delivers a DC voltage that an inverter INV is responsible for converting with a view to delivering control voltages to the electric motor M, via its two or three phases (depending on the configuration of the motor). The battery pack may comprise a plurality of batteries, each battery itself comprising a plurality of storage cells. The system may be reversible and mechanical braking of the motor may also allow the batteries of the battery pack to be recharged. In this conventional topology, as the inverter INV draws power Pbatt from a single battery pack BATT, even if the powers injected via the phases of the motor are not identical, the balance between the batteries present in the battery pack is not affected. In other words, the state of the various batteries present in the battery pack is irrelevant provided that the power required for the motor to operate is available (i.e. that the battery pack is sufficiently charged).

The problem is different when the power-supply topology of an electric machine uses a plurality (one per phase) of separate electric-power-supply assemblies E_1, E_2, E_3 (E_i) as shown in FIG. 2. The power-supply assemblies then each comprise a separate battery pack or a separate battery and have no power connection between them (i.e. no direct transfer of electrical power from one electric-power-supply assembly to another electric-power-supply assembly is possible). Specifically, in this topology, as the power P1, P2, P3 is drawn independently from the three battery packs, the state of the various battery packs has an impact on the operation of the overall electric-power-supply device. In this configuration, with three separate battery packs, if the powers injected via the three phases are not identical, an imbalance may appear between each of the three battery packs. Specifically, a motor is conventionally driven by delivering three voltages or three currents that are out of phase by 120° but that are of the same amplitude. As the windings of the electric motor M are not perfectly identical, the application of a voltage or current of a given amplitude via the three phases will generate different powers in the three phases. In other words, from one phase to the next, even if identical setpoints are applied, the three battery packs will very often be in different states. Over time, they will therefore begin to behave differently when charging or discharging. Moreover, it will be noted that the imbalance between the three battery packs will also possibly be related to the fact that the battery packs are not strictly identical, that their initial state of charge is different, that their operating temperature is different, or that their state of health is different (the latter may change in a different way over time, from one pack to the next).

The aim of the invention is therefore to provide a solution that will allow the differences in state of the battery packs to be managed in a topology in which each phase is connected to one distinct electric-power-supply assembly that is separate from the others from the power point of view.

DESCRIPTION OF THE INVENTION

This aim is achieved via a control method for controlling an electric-power-supply device for supplying electric power to a multi-phase electrical system, said device comprising at least one separate electric-power-supply assembly per phase of said electrical system, each electric-power-supply assembly comprising at least one battery pack defined by a state parameter and equipped with at least one battery intended to deliver a control voltage to the phase to which it is connected, while taking into account at least one setpoint value, said method consisting in:
  executing at least one correction block that receives, as input, each setpoint value and the state parameter of each battery pack of the electric-power-supply assemblies of the system,
  for each electric-power-supply assembly, said correction block being configured to determine a correction value to be applied directly or indirectly to its setpoint value, while taking into account the difference between the value of the state parameter of its battery pack and the value of an optimal state parameter determined from the values of the state parameters of the battery packs of all the electric-power-supply assemblies.

According to one particular feature, for each electric-power-supply assembly, the state parameter of the battery corresponds to its state of charge, its temperature, its internal resistance, its state of health, its charging capacity or a combination of a plurality of these parameters.

According to one particular embodiment, for each electric-power-supply assembly, said setpoint value is corrected according to the following principle:

$$X_{corr\_i} = X_{set} * \left(1 - \frac{ST_i}{ST_{OPT}}\right)$$

where:
  $ST_i$ corresponds to the value of the state parameter of the battery pack of the power-supply assembly i (i=1, 2 or 3);
  $ST_{OPT}$ corresponds to the optimal value of the three state-parameter values;
  $X_{corr\_i}$ corresponds to the correction value to be applied to the setpoint value of the electric-power-supply assembly i;
  $X_{set}$ corresponds to the setpoint value to be applied to the electric-power-supply assembly i.

According to another particular embodiment, for each electric-power-supply assembly, said setpoint value is corrected according to the following principle:

$$X_{corr\_i} = X_{set} * K * \left(1 - \frac{ST_i}{ST_{OPT}}\right)$$

where:
  $ST_i$ corresponds to the value of the state parameter of the battery pack of the power-supply assembly i (i=1, 2 or 3);
  $ST_{OPT}$ corresponds to the optimal value of the three state-parameter values;

$X_{corr\_i}$ corresponds to the correction value to be applied to the setpoint value of the electric-power-supply assembly i;

$X_{set}$ corresponds to the setpoint value to be applied to the electric-power-supply assembly i;

K corresponds to a weighting coefficient.

According to another particular embodiment, for each electric-power-supply assembly, said setpoint value is corrected by implementing a regulation loop with an integral corrector, a proportional-integral corrector or a proportional-integral-derivative corrector, said loop being configured to gradually decrease to zero the differences in the state parameter between the electric-power-supply assemblies.

According to one variant embodiment, the setpoint value is a peak-voltage value.

According to another variant embodiment, the setpoint value is an RMS-current value. According to this other variant, the method consists in executing a current regulation loop configured to determine each RMS-current setpoint value from the values of the currents measured on each phase of the electrical system.

According to another variant embodiment, the setpoint value is an electrical power. According to this other variant, the method comprises a step of determining a current setpoint value from the power setpoint value and from the voltages measured on the phases of the electrical system.

According to one particular feature, the setpoint value is identical for all the power-supply assemblies.

According to one particular embodiment, the method consists in executing a voltage-saturation control block configured to determine a corrected setpoint value, taking into account the control voltages to be applied by each power-supply assembly and each setpoint value and said determined corrected setpoint value becomes the setpoint value input into said correction block.

According to another particular embodiment, the method comprises a step of reading at least one input representative of a charging mode or of a discharging mode of each battery pack.

The invention also relates to a control system for controlling an electric-power-supply device for supplying electric power to a multi-phase electrical system, said device comprising at least one separate electric-power-supply assembly per phase of said electrical system, each electric-power-supply assembly comprising at least one battery pack defined by a state parameter and equipped with at least one battery intended to deliver a control voltage to the phase to which it is connected, while taking into account at least one setpoint value, said system comprising:

at least one correction block that receives, as input, each setpoint value and the state parameter of each battery pack of the electric-power-supply assemblies of the electrical system, for each electric-power-supply assembly, said correction block being configured to determine a correction value to be applied directly or indirectly to its setpoint value, while taking into account the difference between the value of the state parameter of its battery pack and the value of an optimal state parameter determined from the values of the state parameters of the battery packs of all the electric-power-supply assemblies.

According to one particular embodiment, the system may comprise a voltage-saturation control block configured to determine a corrected setpoint value, taking into account the control voltages to be applied by each power-supply assembly and each setpoint value, said determined corrected setpoint value becoming the setpoint value input into said correction block.

According to one particular embodiment, the system may include at least one block for reading an input representative of a charging mode or of a discharging mode of each battery pack.

The invention also relates to an electric-power-supply device for supplying electric power to a multi-phase electrical system, said device comprising at least one separate electric-power-supply assembly per phase of said electrical system, each electric-power-supply assembly comprising at least one battery pack defined by a state parameter and equipped with at least one battery intended to deliver a control voltage to the phase to which it is connected, while taking into account at least one setpoint value, said device comprising a control system such as defined above, suitable for controlling each electric-power-supply assembly of the device so as to obtain a complete charge or a complete discharge of all the battery packs simultaneously.

BRIEF DESCRIPTION OF THE FIGURES

Other features and advantages will become apparent from the following detailed description, which is given with reference to the appended drawings, in which.

DETAILED DESCRIPTION OF AT LEAST ONE EMBODIMENT

The invention is applicable to the control of an electric machine, an electric motor M for example. The electric motor may be of any type, synchronous or asynchronous. It has two or more phases. In the following description and in the appended figures, non-limitingly, the invention is described with respect to a three-phase electric motor M.

The electric motor M is supplied with power by an electric-power-supply device, which comprises a plurality of separate electric-power-supply assemblies $E\_1$, $E\_2$, $E\_3$. One separate electric-power-supply assembly is connected to each phase of the electric motor.

In the rest of the description, reference is made to battery packs. A battery pack BATT comprises at least one battery, and as a general rule a plurality of batteries arranged in series and parallel, with a view to delivering a DC voltage. Each battery comprises a plurality of storage cells for storing electrical energy.

It will be recalled that, by cell, what is meant is an elementary cell or a group of elementary cells placed in series and/or in parallel. An elementary cell may be a storage element (battery cell, electrical capacitor, µbattery, etc.), a generator (fuel cell, zinc-air cell, photovoltaic cell) or a combination of both (generator associated with a buffer storage element). The voltage of a cell is typically comprised between 2.5 V and 50 V.

Figure 3A:
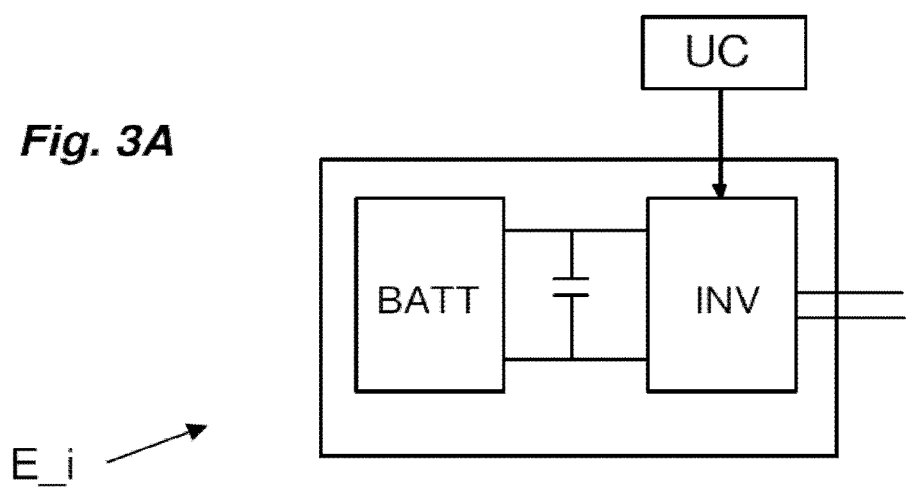
FIGS. 3A and 3B show two variant embodiments of an electric-power-supply assembly employed in a power-supply device according to FIG. 2.
Figure 3B:
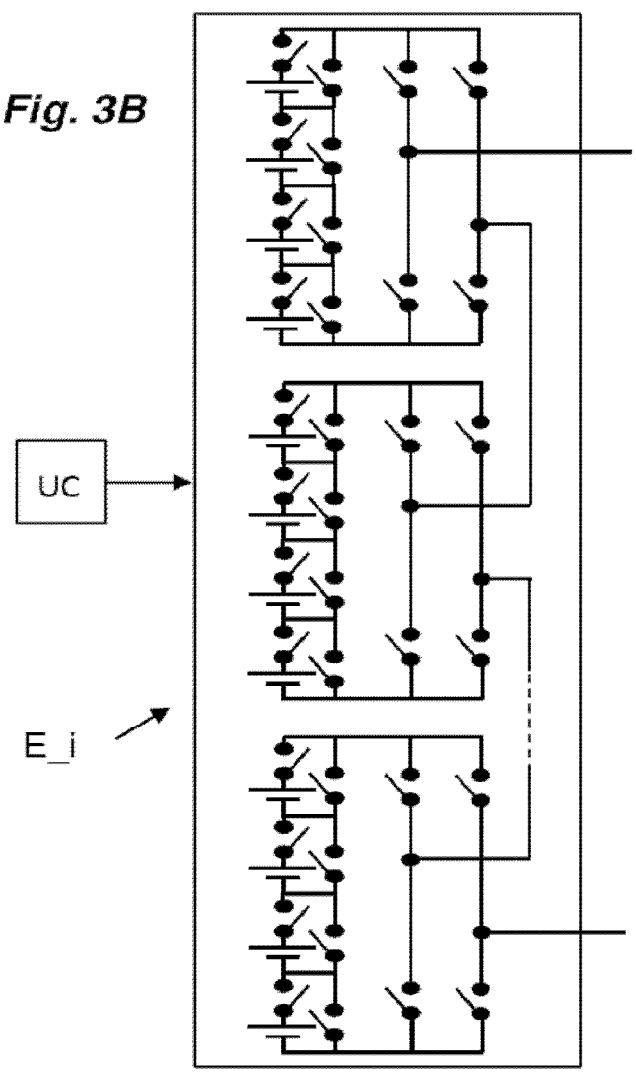

Each electric-power-supply assembly may adopt two distinct configurations:
 a first configuration, shown in FIG. 3A, in which the assembly comprises at least one battery pack BATT and an inverter INV;
 a second configuration, shown in FIG. 3B, in which the assembly comprises at least one battery pack, each battery of which is made up of what are called switched cells.

In the first configuration, the inverter INV receives a DC voltage from the battery pack and is controlled by a control system UC to convert it into a variable voltage intended for the electric motor.

In the second configuration, each cell of a battery of the battery pack BATT may be switched between an active state and an inactive state by means of suitable switching means connected in series and parallel to each cell. A control system UC is responsible for controlling the switching means with a view to varying the voltage output from each battery of the pack, and therefore from the battery pack as a whole. The battery pack is then controlled to apply a variable voltage to the electric motor. This type of architecture is notably described in patent applications Nos WO2013/007810A1, WO2012/117111A1, WO2012/117110A2, WO2012/117/109A1 and U.S. Pat. No. 9,493,090B2. Alternatively, the cells are switched in series/parallel, as described in patents WO2013007810 and WO2012168426. This arrangement notably allows positive and negative voltages, such as the waveform shown in FIG. 3C, to be generated.

In the first configuration, each control voltage may be generated by the system by means of pulse width modulation (PWM), allowing the control orders for controlling the switches of the inverter INV to be defined.

In the second configuration, the control voltage is generated by the system by determining the number of cells of the battery pack to be connected to the phase of the electric motor depending on the control voltage to be applied.

In the appended drawings, three drivers BP_1, BP_2, BP_3 of the control system UC are schematically shown, each receiving one different peak-voltage control value to be applied to one phase with a view to defining the control orders Cd_1, Cd_2, Cd_3 to be applied to the three electric-power-supply assemblies E_1, E_2, E_3.

In the rest of the description and in the appended drawings, we will refer generally to an electric-power-supply assembly E_1, E_2, E_3 to take account of the two configurations described above. In both configurations, the electric-power-supply assembly comprises at least one battery pack. The control system may comprise a plurality of monitoring blocks each associated with one separate electric-power-supply assembly. The control system may notably comprise a microprocessor, means for storing data in memory and inputs for receiving measurement data and outputs for sending control orders.

Figure 1:
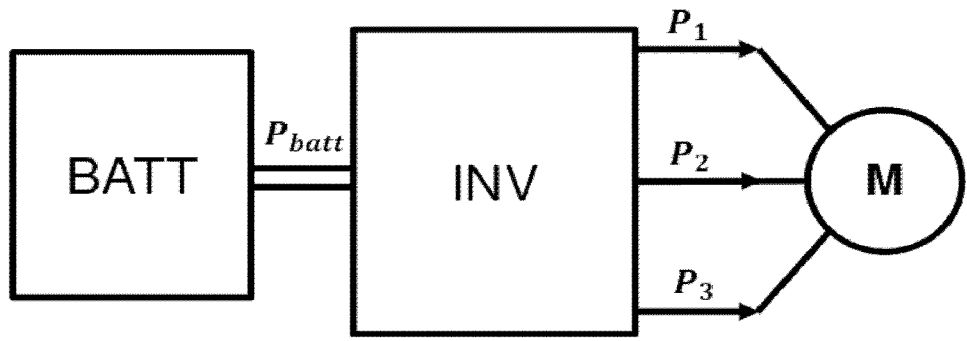
FIG. 1 shows a known prior-art power-supply device for supplying power to an electric machine.
Figure 2:
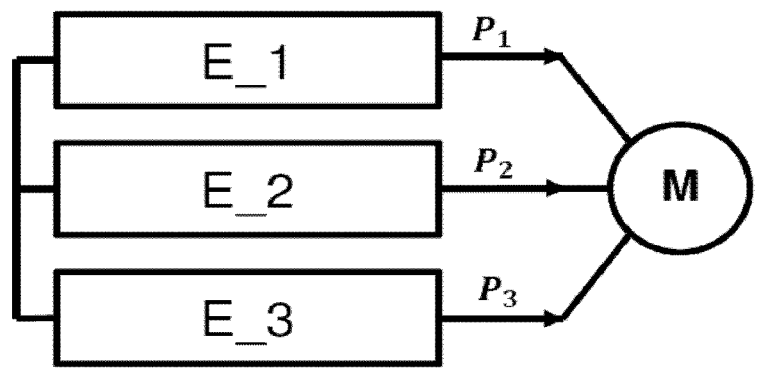
FIG. 2 shows a power-supply device for supplying power to an electric machine, to which device the principle of the invention has been applied.

In the architecture of FIG. 2, the three power-supply assemblies E_1, E_2, E_3 are of course connected to one another in order to allow current to be passed between the phases.

According to one particular aspect of the invention, the electric-power-supply assemblies each operate independently. Direct transfer of electrical power from a battery pack of one electric-power-supply assembly to a battery pack of another electric-power-supply assembly is impossible.

Figure 3C:
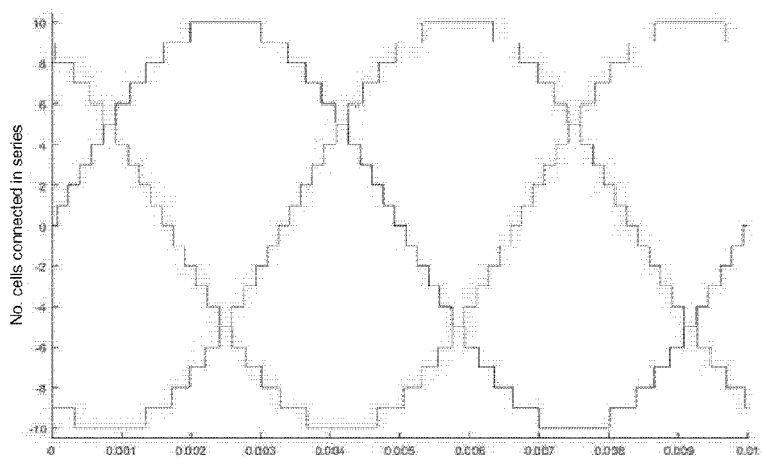
FIG. 3C illustrates the voltage profile delivered by the three electric-power-supply assemblies shown in FIG. 3B.

With reference to FIG. 3C, each electric-power-supply assembly E_1, E_2, E_3 is controlled so as to generate a variable voltage having a sinusoidal profile, the sinusoid being formed from a plurality of successive voltage plateaus. Regarding the three phases, the three voltages are out of phase by 120°.

Figure 4:
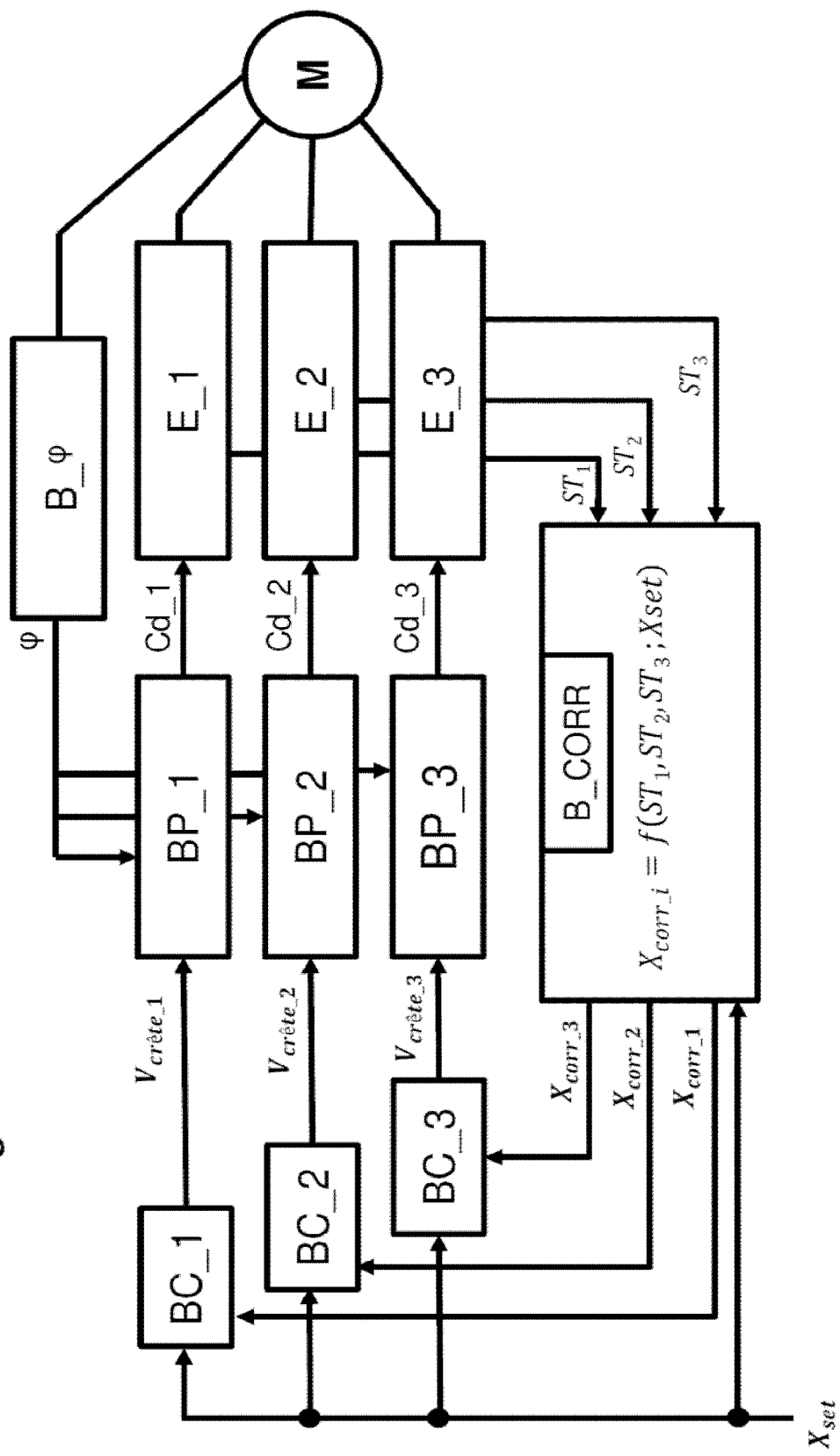
FIG. 4 shows a control diagram generally illustrating the control method of the invention.

With reference to FIG. 4, for each electric-power-supply assembly, the control system UC receives one setpoint value $X_{set}$.

According to various variant embodiments which will be described below, the setpoint value $X_{set}$ may be:
 a peak-voltage value;
 an RMS-electric-current value;
 a value of the electrical power to be supplied.

The setpoint value is advantageously common to all the phases but, in certain configurations (open-loop control for example), it may be different for each phase.

Depending on this setpoint value, the control system UC computes, for each phase of the electric motor, a peak-voltage control value $V_{crête\_1}$, $V_{crête\_2}$, $V_{crête\_3}$. To do this, the control system is configured to execute a plurality of control blocks, one control block BC_1, BC_2, BC_3 per phase. As illustrated by the appended figures, each control block receives a setpoint value to be generated as output and determines the peak-voltage control value $V_{crête\_1}$, $V_{crête\_2}$, $V_{crête\_3}$ to be applied to each driver BP_1, BP_2, BP_3.

It will be seen below that the control blocks BC_1, BC_2, BC_3 may be realized according to various variant embodiments.

Each control block BP_1, BP_2, BP_3 determines, for its phase, the control orders Cd_1, Cd_2, Cd_3 to be given to the electric-power-supply assembly E_1, E_2, E_3 to which it is assigned.

Conventionally, the drivers BP_1, BP_2, BP_3 are synchronized with the electrical position of the motor, which position is referenced φ and supplied by a determination block B_φ, which uses Hall-effect sensors located in the motor. Alternatively, this position φ may be estimated sensorlessly (sensorless mode) by a position estimator, which may use the voltages and/or currents of the motor. Alternatively, the motor may be asynchronous, this meaning that it is not necessary to know the angular position of the motor for synchronization.

It will be recalled that, in real life, the windings of the electric motor M are not perfectly identical, and that therefore the current consumed by the motor M, via the three phases, does not depend solely on the voltage and on the torque applied to the motor, but also depends on the characteristics of the various windings and of the various magnetic circuits, and on manufacturing imperfections. Therefore, the consumption is not necessarily identical for each phase, even if the voltage applied to the three phases is of the same amplitude, and hence, from one electric-power-supply assembly to the next, the battery packs will not be discharged in the same way.

In addition, the three battery packs are not perfectly identical, because they may have a different state, defined by a state parameter $ST_i$ associated with each battery pack.

This state parameter $ST_i$ may correspond to any function of one or more parameters such as the state of charge (SOC) of the battery pack, the state of health (SOH) of the cells of the battery pack, the storage capacity of the cells of the battery pack, the internal resistance of the cells of the battery pack, the temperature of the cells of the battery pack, the requested current, the requested power, the type of cells used in the battery pack, the types of defects detected in the battery pack or in the cells of the battery pack, etc. This function may also be weighted by parameters unrelated to the state of the battery pack. It is for example possible to voluntarily accelerate charging/discharging of the battery pack in order to characterize it or to place it in a desired state of charge or in a safe state.

Each battery pack may thus incorporate the sensors required to measure/determine these various parameters, notably for example a temperature sensor in each of its cells, current and voltage sensors in each cell, means for determining state of charge and state of health using known algorithms, and means for measuring internal resistance. Each battery pack may incorporate a localized monitoring block allowing it to compute and monitor these various parameters.

The two effects mentioned above, i.e. a difference in consumption between the battery packs, and battery packs that are not necessarily all identical from one power-supply assembly to the next, induce an imbalance between the three battery packs, which will thus not be charged or discharged to the same level and which run the risk of not reaching the end of charging or discharging at the same time. This phenomenon is notably illustrated by FIGS. 12 and 13, which will be explained below.

The proposed solution, which is schematically represented in FIG. 4 by the correction block B_CORR, consists in correcting the setpoint value $X_{set}$ injected into each control block BC_1, BC_2, BC_3 in proportion to the difference between the value of the state parameter $ST_i$ of the battery pack of the power-supply assembly E_i to be driven and the values of the state parameter of the battery pack of the other two electric-power-supply assemblies. Thus, this setpoint value $X_{set}$ will be decreased for the electric-power-supply assembly or for the electric-power-supply assemblies the battery packs of which are discharging too rapidly and it will thus be made possible to discharge the battery packs uniformly so as to make them finish discharging at the same time. In this way, use of the energy of the battery pack is maximized. The same principle will be applicable to charging: the applied correction allows the setpoint value $X_{set}$ to be increased for the electric-power-supply assembly or the electric-power-supply assemblies that are charging too rapidly, thus allowing the battery sub-packs to be charged uniformly so as to make them finish charging at the same time.

In FIG. 4, the correction block B_CORR thus receives as input the values $ST_1$, $ST_2$, $ST_3$ of the state parameter of the battery packs of the three electric-power-supply assemblies then determines the correction value $X_{corr\_1}$, $X_{corr\_2}$, $X_{corr\_3}$ to be applied to the setpoint value separately for each electric-power-supply assembly. It thus applies the following relationship:

$$X_{corr\_i} = f(ST_1, ST_2, ST_3; X_{set})$$

Non-limitingly, the setpoint value $X_{set}$ may be identical for all three phases (as in FIG. 4) or could be chosen to be different for each phase.

The computed correction $X_{corr\_i}$ is then applied to the setpoint value $X_{set}$ in each control block BC_i so as to determine a corrected setpoint value $V_{crête\_i}$ for each phase i.

The correction block may apply various correction mechanisms via the function $f$ defined above:

a first mechanism is illustrated by the following equation:

$$X_{corr\_i} = X_{set} * \left(1 - \frac{ST_i}{ST_{OPT}}\right) \quad (1)$$

in which:
 $ST_i$ corresponds to the value of the state parameter of the battery pack of the power-supply assembly i (i=1, 2 or 3);
 $ST_{OPT}$ corresponds to the optimal value of the three state-parameter values; depending on the chosen state parameter, it may be a maximum value or a minimum value;
 $X_{corr\_i}$ corresponds to the correction value to be applied to the setpoint value of the electric-power-supply assembly i;
 $X_{set}$ corresponds to the setpoint value to be applied to the electric-power-supply assembly i.

Other correction mechanisms may be used, K-weighting for example being applied as follows:

$$X_{corr\_i} = X_{set} * K * \left(1 - \frac{ST_i}{ST_{OPT}}\right)$$

Another mechanism for correcting the setpoint value consists in creating a regulation loop with an integral corrector, proportional-integral (PI) corrector or proportional-integral-derivative (PID) corrector, which tends to gradually decrease to zero the differences in the state parameter. This correction may for example be of integral type:

$$X_{corr\_i} = K_i \int_0^t (ST_i - ST_{OPT}) dt$$

This integral may of course be limited, for example to limit the difference between the corrected setpoint value $X'_{set\_i}$ and the setpoint value $X_{set}$, for example to a value lower than 5%.

Using equation (1) above, it will be understood that the setpoint value of the power-supply assembly having the state parameter $ST_i$ that is optimal (and therefore equal to $ST_{OPT}$) will not be corrected (correction equal to zero), and that the setpoint value of the other two electric-power-supply assemblies will be lower or higher in proportion to the difference between the state parameter of their battery pack and the state parameter of the battery pack the state parameter of which is optimal. It should be noted that if none of the three battery packs has a state parameter which is that of the optimal state $ST_{OPT}$, each setpoint value will be corrected.

The correction block may also make provision to limit the correction values after computation thereof, so as not to compromise the performance or correct operation of the motor should the corrections be very different between the three phases. Specifically, the motor runs the risk of not operating correctly if the voltages are too different from one another. It is better to favor correct operation of the motor, to the detriment of the performance in respect of the balance between the three battery packs.

According to one particular aspect of the invention, for all the configurations that are described below, it is possible to add an additional voltage-saturation control block B_SAT, which decreases the setpoint value if at least one voltage across the three phases saturates at its maximum value. This block receives as input the setpoint value and the peak-voltage control value $V_{crête\_1}$, $V_{crête\_2}$, $V_{crête\_3}$ to be applied to the three phases or measured directly across the three phases.

This block B_SAT, which must know the maximum voltage value that each battery pack is able to generate, decreases the setpoint value when a first voltage (among the 3 phases) saturates at its maximum value. In this way, the voltage-saturation control block makes it possible to ensure that no voltage saturates and that the correction block B_CORR for correcting the setpoint value may perform its function of balancing the three battery packs. Generally, this voltage-saturation block applies the following relationship:

$$X'_{set\_i} = f(X_{set\_i}; V_{crête\_1,2,3})$$

It will be seen below that this voltage-saturation control block B_SAT may be applied whatever the quantity, i.e. current, voltage or power, used for the setpoint value.

Based on these general principles, a plurality of possible embodiments that in particular use various quantities as setpoint values are presented below.

In the various examples given below, the chosen state parameter is the state of charge of each battery pack, which is referenced $SOC_i$, with i corresponding to the reference index of the battery pack in question. The optimum state parameter mentioned above thus corresponds to the highest state of charge of one of the three battery packs and is referenced $SOC_{MAX}$. Of course, it should be understood that the principles set out below may be applied identically to a different state parameter.

Peak-Voltage Setpoint Value

Figure 5:
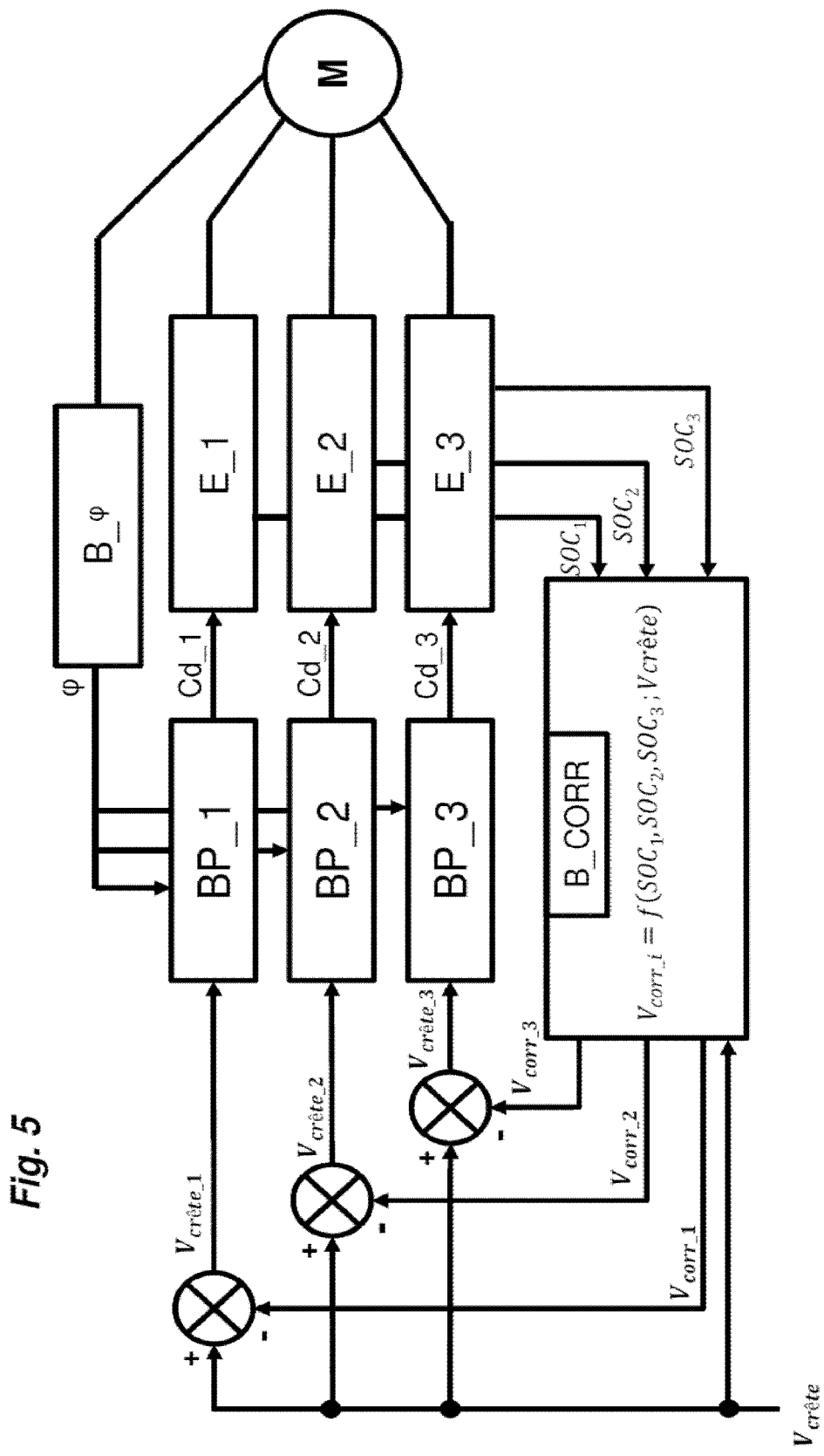
FIGS. 5 to 11 represent control diagrams illustrating a plurality of embodiments of the control method of the invention.

In FIG. 5, the setpoint value is a peak-voltage value $V_{crête}$. The correction block B_CORR thus applies the following relationship:

$$V_{corr\_i} = f(SOC_i; V_{crête})$$

The correction block B_CORR thus determines three correction values $V_{corr\_1}$, $V_{corr\_2}$, $V_{corr\_3}$ to be applied to the setpoint value $V_{crête}$ so as to obtain three corrected setpoint values that correspond to the three control voltages $V_{crête\_1}$, $V_{crête\_2}$, $V_{crête\_3}$. Each control block defined above thus consists in applying the computed correction value to the setpoint value in order to directly determine the three control voltages $V_{crête\_1}$, $V_{crête\_2}$, $V_{crête\_3}$.

With reference to FIG. 5, one example of correction of the setpoint value is given by the following equation:

$$V_{corr\_i} = V_{crête} * \left(1 - \frac{SOC_i}{SOC_{MAX}}\right) \quad (2)$$

Other correction equations may be used, for example K-weighting may be used:

$$V_{corr\_i} = V_{crête} * K * \left(1 - \frac{SOC_i}{SOC_{MAX}}\right)$$

Another example of correction of the setpoint consists in forming a regulation loop that tends to gradually decrease the differences in state of charge to zero. This correction may for example be of integral type:

$$V_{corr\_i} = K_i \int_0^t (SOC_i - SOC_{MAX}) dt$$

This integral may of course be limited, for example to limit the difference between the control voltage $V_{crête\_i}$ and the setpoint value $V_{crête}$ to lower than 5%.

Using equation (2) above, the setpoint value applied to the electric-power-supply assembly equipped with the battery pack having the highest state of charge $SOC_i$ (equal to $SOC_{MAX}$) will not be corrected (correction equal to zero), and the setpoint value of the other two electric-power-supply assemblies will be lowered in proportion to the difference between the state of charge $SOC_i$ of their battery pack and the state of charge of the battery pack with the highest state of charge.

The correction block may also make provision to limit the correction values after computation thereof, so as not to compromise the performance or correct operation of the motor should the corrections be very different between the three phases. Specifically, the motor runs the risk of not operating correctly if the voltages are too different from one another. It is better to favor correct operation of the motor, to the detriment of the performance in respect of the balance between the three battery packs.

In one alternative embodiment, the electric motor may be driven in an open-loop mode, with three separate setpoint values per phase.

The voltage-saturation block B_SAT may also be integrated in a manner identical to that described above.

It should be noted that the solution of FIG. 5 is applicable to charging or to discharging. Specifically, in a voltage-control mode, for example during regenerative braking, the speed of the motor is set and the system must thus deal with the value of the current. In order to control the charging current, it is then possible to measure the currents flowing through the three phases and to apply a correction to the peak-voltage setpoints in the same way as in discharging mode.

RMS-Current Setpoint Value

Figure 6A:
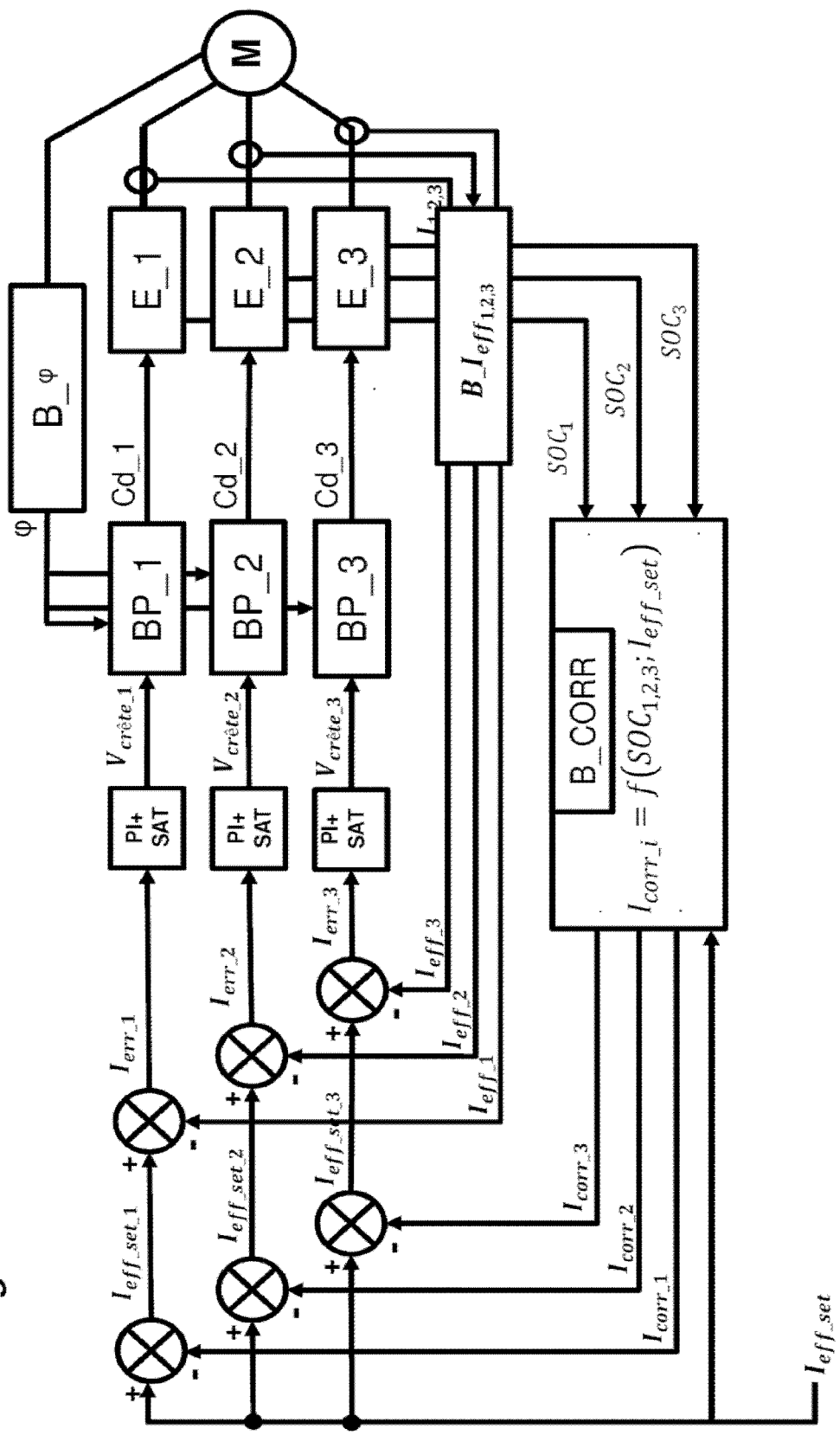
Figure 6B:
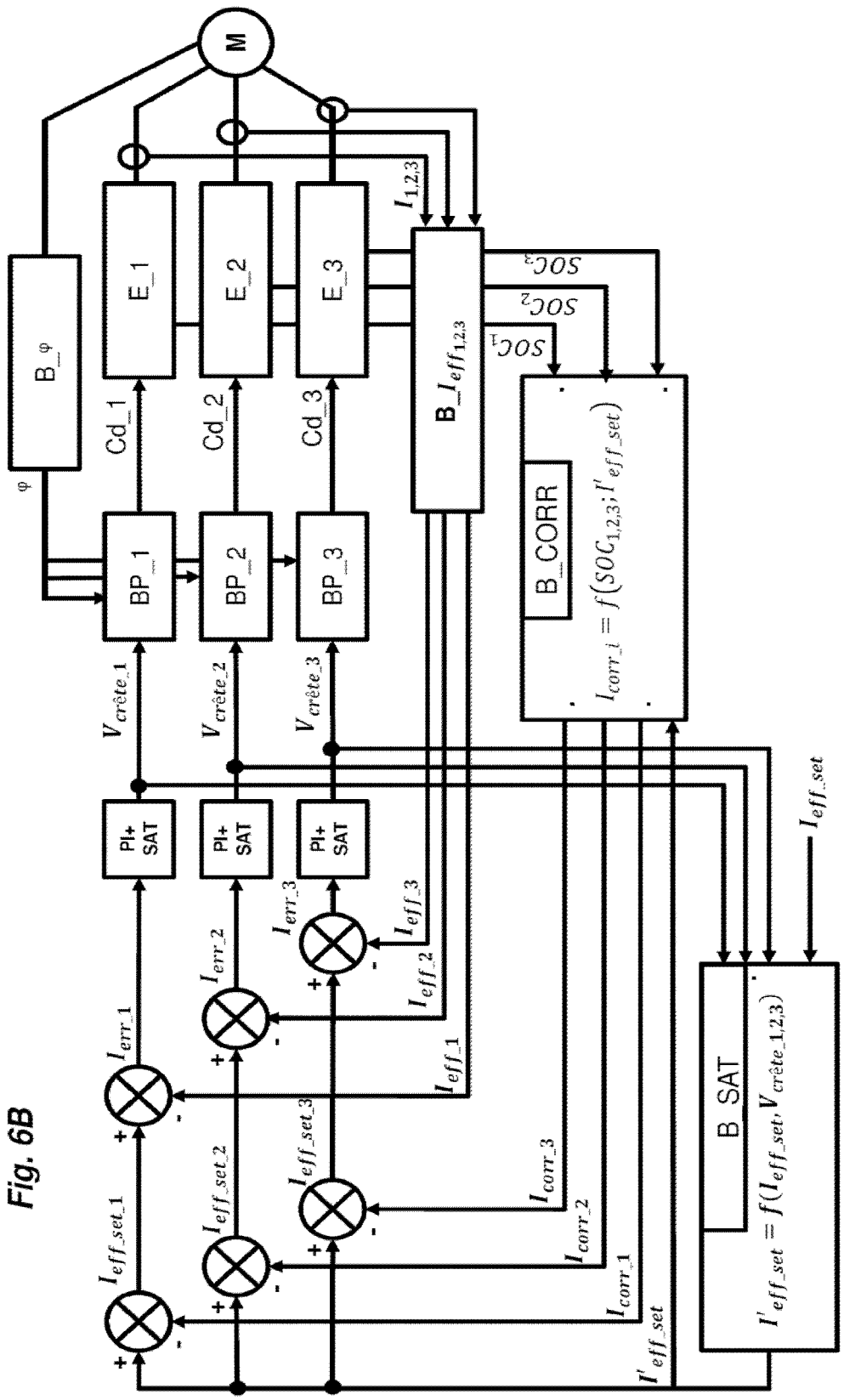
Figure 6C:
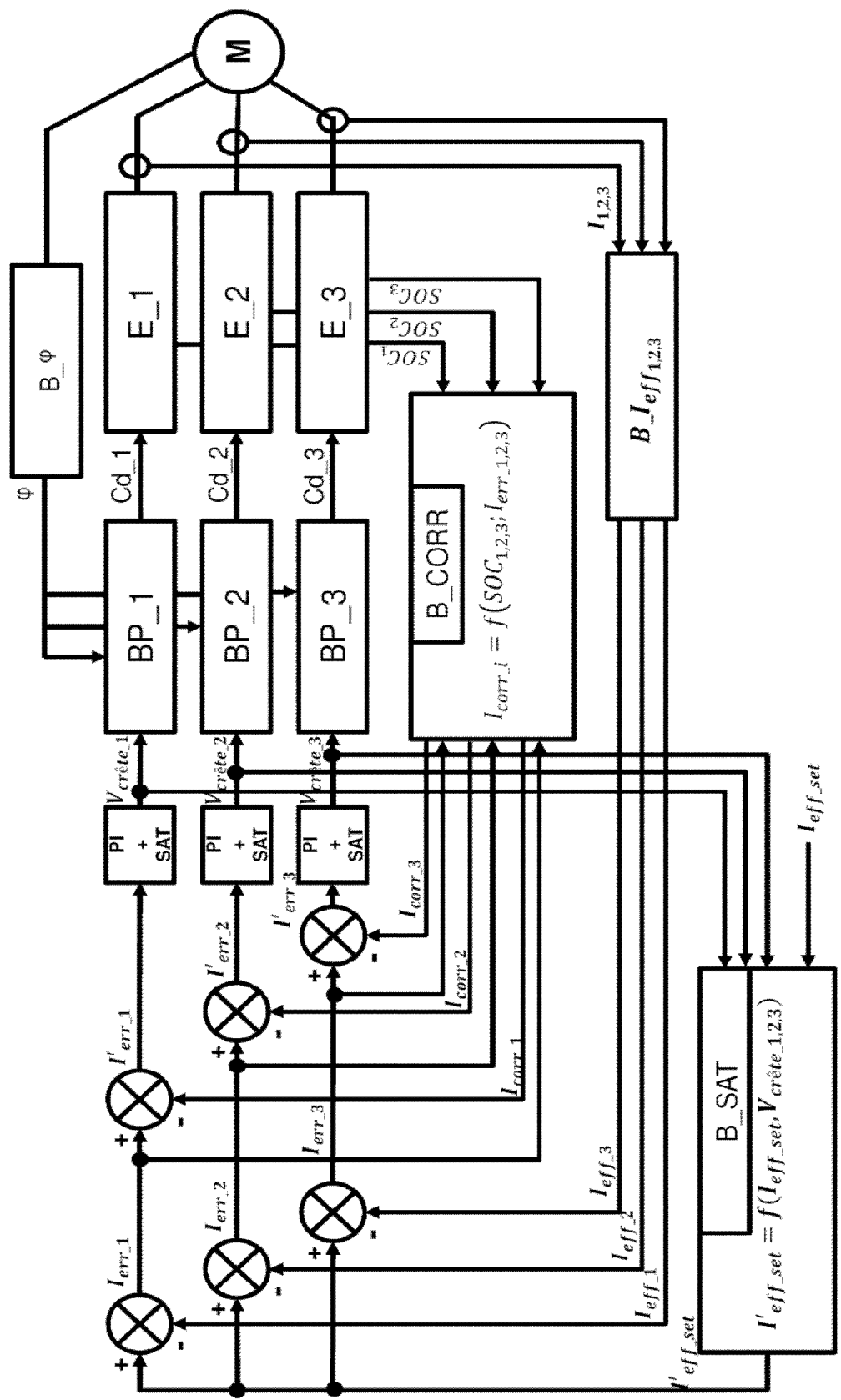

In FIGS. 6A to 6C, the setpoint value is an RMS-current value $I_{eff\_set}$.

As the setpoint is an RMS current, the system may use a current regulation loop. This regulation loop uses one corrector (referenced PI+SAT) per phase, which computes the control voltages $V_{crête\_1}$, $V_{crête\_2}$, $V_{crête\_3}$, while taking into account the error of the corresponding current loop (in order to decrease this error to zero).

A voltage saturation may be directly included in each corrector of the regulation loop. The regulation loop may comprise a determination block $B\_I_{eff1,2,3}$ for determining RMS currents $I_{eff\_1}$, $I_{eff\_2}$, $I_{eff\_3}$ for the three phases, from instantaneous measurements of current $I_1$, $I_2$, $I_3$ flowing through the motor M. Alternatively, this determination block $B\_I_{eff1,2,3}$ will possibly use only two instantaneous currents to compute the three RMS currents.

As above, the three battery packs may become unbalanced, as a result of a difference in consumption by the three phases or as a result of a structural or functional difference between the battery packs (state of charge, state of health, charging capacity, internal resistance, temperature, etc.).

A correction block B_CORR for correcting the RMS-current setpoint value $I_{eff\_set}$ is therefore applied for the three control blocks, as shown in FIG. 6A. This correction block thus applies the following relationship:

$$I_{corr\_i} = f(SOC_{1,2,3}; I_{eff\_set})$$

The correction block B_CORR thus determines three correction values $I_{corr\_1}$, $I_{corr\_2}$, $I_{corr\_3}$ to be applied to the RMS-current setpoint value so as to obtain three corrected current setpoint values $I_{\it{eff\_set\_1}}$, $I_{\it{eff\_set\_2}}$, $I_{\it{eff\_set\_3}}$. These three corrected setpoint values are then injected as input into the current regulation loop. In the current regulation loop, these three corrected setpoint values $I_{\it{eff\_set\_1}}$, $I_{\it{eff\_set\_2}}$, $I_{\it{eff\_set\_3}}$, are compared to the three RMS values $I_{\it{eff\_1}}$, $I_{\it{eff\_2}}$, $I_{\it{eff\_3}}$ determined by the block B_$I_{\it{eff1,2,3}}$ in order to determine the current errors $I_{\it{err\_1}}$, $I_{\it{err\_2}}$, $I_{\it{err\_3}}$ in the three phases. The corrector of the current regulation loop then allows the three control voltages $V_{\it{crête\_1}}$, $V_{\it{crête\_2}}$, $V_{\it{crête\_3}}$ to be sent to the drivers BP_1, BP_2, BP_3 to be determined.

The correction implemented by the correction block B_CORR, which is proportional to the difference in the state of charge $SOC_i$ of the battery pack of one electric-power-supply assembly and those of the battery packs of the other electric-power-supply assemblies, allows the RMS-current setpoint value $I_{\it{eff\_set}}$ for the battery pack or battery packs that are discharging too rapidly to be decreased and a compensating differential current to be generated between the three phases, in order to discharge the battery packs uniformly and to make them finish discharging at the same time. As in the previous example, the same method is applicable to charging.

An example of correction of the current setpoint value, which correction is carried out in the correction block B_CORR, is given by the following equation:

$$I_{corr\_i} = I_{\it{eff\_set}} * \left(1 - \frac{SOC_i}{SOC_{MAX}}\right) \quad (3)$$

Other correction equations are possible.

Another example of correction of the setpoint value consists in forming a regulation loop that tends to gradually decrease the differences in the state of charge to zero. This correction may for example be of integral type:

$$I_{corr\_i} = K_i \int_0^t (SOC_i - SOC_{MAX}) dt$$

This integral may of course be limited, to limit the difference between the setpoint value $I_{\it{eff\_set}}$ and the corrected setpoint value $I_{\it{eff\_set\_i}}$ to a given value, for example equal to lower than 15%.

Using equation (3) above, the RMS-current setpoint value of the battery pack with the state of charge $SOC_{MAX}$ will not be corrected (correction equal to zero).

The effectiveness of the solution presented in FIG. 6A is limited in the case where the three control voltages $V_{\it{crête\_1}}$, $V_{\it{crête\_2}}$, $V_{\it{crête\_3}}$ computed by the PI correctors saturate at the maximum voltage attainable by the battery packs. In this case, specifically, the three battery packs deliver a voltage that is independent of the current correction generated by the correction block B_CORR, and therefore one that is independent of their difference in state. It is no longer possible to balance the three battery packs, because the correction is unable to generate a compensating differential current. This situation may arise in the case where the torque counteracting the torque delivered by the motor is too low, with respect to the current setpoint value (for example, in the case of a motor running loadlessly, i.e. without load). To reach the setpoint current, theoretically a higher voltage than that which the battery pack is able to deliver and/or the motor is able to withstand would be required.

To remove this limitation on balancing, it is necessary to add, to the RMS-current setpoint, the peak-voltage-saturation control block B_SAT, which decreases the RMS-current setpoint if at least one peak voltage of the three phases saturates at its maximum value.

This block, as shown in FIG. 6B, receives the RMS-current setpoint value $I_{\it{eff\_set}}$ and the control voltages $V_{\it{crête\_1}}$, $V_{\it{crête\_2}}$, $V_{\it{crête\_3}}$ as input, and computes the new RMS-current setpoint using the following relationship:

$$I'_{\it{eff\_set}} = f(I_{\it{eff\_set}}; V_{\it{crête\_1,2,3}})$$

Alternatively, this peak-voltage-saturation control block B_SAT may obtain the peak-voltage values of the three phases directly by measuring the voltage output by the three battery packs.

This block B_SAT, which must know the maximum voltage value that each battery pack is able to generate, decreases the RMS-current setpoint value $I_{\it{eff\_set}}$, to give it the value $I'_{\it{eff\_set}}$ that will then be sent to the current regulation loop, when a first voltage (among the three phases) saturates at its maximum value. In this way, this peak-voltage-saturation control block B_SAT makes it possible to ensure that none of the voltages saturate. The correction block B_CORR for correcting the RMS-current setpoint may then perform its function of balancing the three battery packs.

Since the peak-voltage-saturation control block B_SAT ensures that none of the voltages saturate, it would be possible to remove the peak-voltage-saturation function from the PI correctors. However, in this example, the PI correctors still incorporate this function, in order to make the system more robust. Specifically, the effect of the peak-voltage-saturation control block may be delayed, because of the automatic-control loop and of the PI correctors, and of the potential delay in communication between the blocks and in computation of the functions of the various blocks. The saturation of the peak voltage, which occurs (in the PI block) just before said saturation is passed to the corresponding driver BP_1, BP_2, BP_3, ensures that a peak-voltage value higher than the maximum value attainable by the battery pack is never delivered.

FIG. 6C shows a variant embodiment of the solutions of FIGS. 6A and 6B. In this variant, rather than correcting the RMS-current setpoint value $I_{\it{eff\_set}}$, the correction block B_CORR applies the correction values $I_{corr\_1}$, $I_{corr\_2}$, $I_{corr\_3}$ computed, for each phase, directly to the current errors $I_{\it{err\_1}}$, $I_{\it{err\_2}}$, $I_{\it{err\_3}}$ determined by the regulation loop, before they are delivered to the PI corrector that is intended to determine the control voltages $V_{\it{crête\_1}}$, $V_{\it{crête\_2}}$, $V_{\it{crête\_3}}$. The correction block B_CORR then receives the RMS-current errors $I_{\it{err\_1}}$, $I_{\it{err\_2}}$, $I_{\it{err\_3}}$ and the states of charge $SOC_{1,2,3}$ of the three battery packs as input.

The correction block B_CORR then no longer directly makes a correction that is proportional to the current setpoint $I_{\it{eff\_set}}$, but rather makes one that is proportional to the current error internal to the current regulation loop of the phase to be corrected.

$$I_- = I_{\it{eff\_set}} * \left(1 - \frac{SOC_i}{SOC_{MAX}}\right) \quad (3)$$

therefore becomes:

$$I_{corr\_i} = f(SOC_{1,2,3}; I_{\it{err\_1,2,3}})$$

Namely, for example, incorporating the same correction principle:

$$I_{corr_i} = I_{err_i} * \left(1 - \frac{SOC_i}{SOC_{MAX}}\right)$$

Power Setpoint Value

Figure 7A:
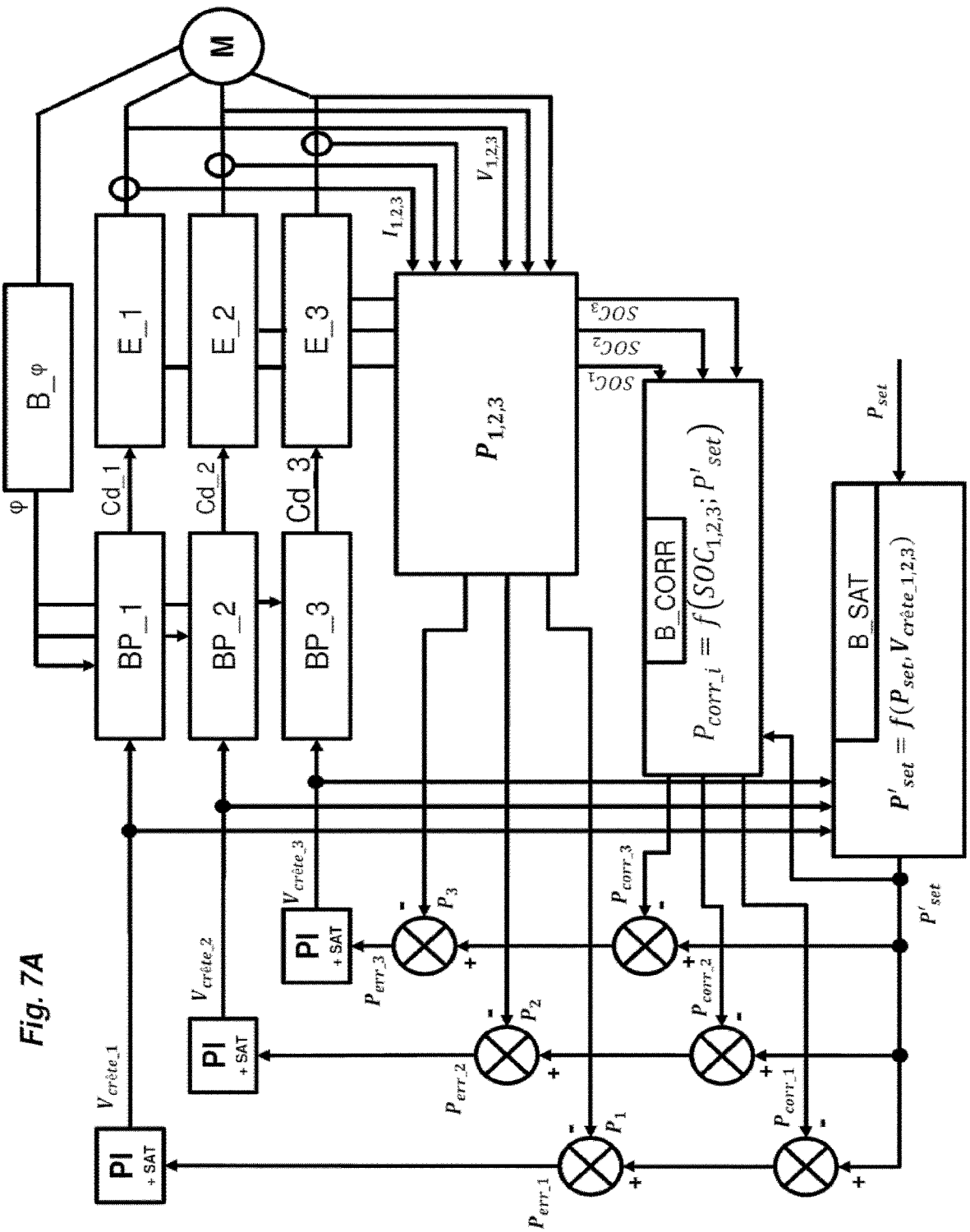

With reference to FIG. 7A, the system is driven in power mode with the same setpoint value $P_{set}$ for the three phases and it contains one power regulation loop per phase. A power-determination block $P_{1,2,3}$ computes the output power of the three phases, from the output voltages $V_1$, $V_2$, $V_3$ and currents $I_1$, $I_2$, $I_3$ of the three electric-power-supply assemblies. PI (proportional-integral) correctors compute, for each phase, from the power error $P_{err\_1}$, $P_{err\_2}$, $P_{err\_3}$, the control voltage $V_{crête\_1}$, $V_{crête\_2}$, $V_{crête\_3}$ to be generated by the corresponding electric-power-supply assembly, this computation optionally including a function whereby this voltage saturates at a maximum voltage value attainable by the electric-power-supply assembly.

As above, in order to ensure the charge of the battery packs remains balanced, the system comprises a specific correction block B_CORR for correcting the power setpoint value $P_{set}$, which allows the power setpoint value to be decreased for the battery pack or battery packs that are discharging too rapidly and a compensating differential current to be generated between the three phases. The power correction for each battery pack is proportional to the difference between the state of charge $SOC_i$ of the battery pack of the electric-power-supply assembly the setpoint value of which is to be corrected and the state of charge of the other battery packs.

The correction block B_CORR thus applies the following relationship:

$$P_{corr\_i} = f(SOC_{1,2,3}; P'_{set})$$

in which $P'_{set}$ corresponds to the corrected power setpoint value after the voltage-saturation block B_SAT has been applied to the setpoint value $P_{set}$ (see below).

An example of correction of the power setpoint value is given by the following equation:

$$P_{corr\_i} = P'_{set} * \left(1 - \frac{SOC_i}{SOC_{MAX}}\right) \quad (4)$$

It is also possible to use a regulation loop that adjusts the correction value $P_{corr\_i}$ so as to decrease to zero the difference between the state of charge $SOC_i$ and the highest state of charge $SOC_{MAX}$. The corrector of this automatic-control loop may for example be an integral corrector, proportional-integral corrector, proportional-integral-derivative corrector, or another type of corrector.

Using equation (4) above, the power setpoint value of the electric-power-supply assembly equipped with the battery pack with the highest state of charge $SOC_i$ (equal to $SOC_{MAX}$) will not be corrected (correction equal to zero), and the setpoint value of the other two electric-power-supply assemblies will be corrected in proportion to the difference between the state of charge of their battery pack and the highest state of charge $SOC_{MAX}$.

Likewise, the principle is applicable to the charging of battery packs and makes it possible to ensure that all the battery packs finish charging at the same time.

Figure 7B:
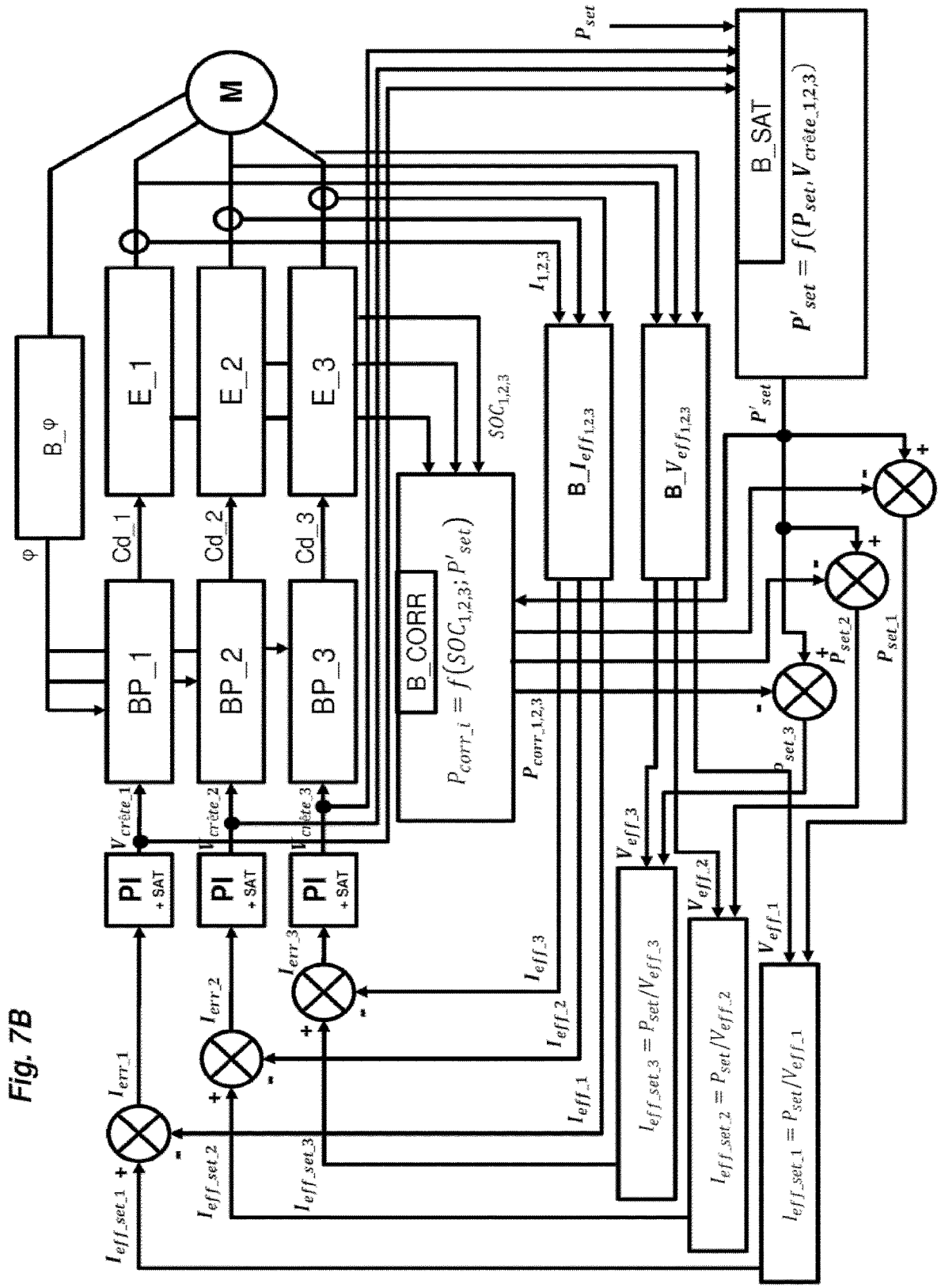

FIG. 7B shows a variant embodiment of the configuration of FIG. 7A. In this variant embodiment, the power setpoint value may be converted directly into a plurality of current setpoint values, simply by applying the following relationship:

$$I_{eff\_set\_i} = P_{set}/V_{eff\_i}$$

in which $V_{eff\_i}$ is the RMS voltage measured on the phase in question.

This variant may then incorporate the current regulation loop already described above to regulate the currents to their setpoint value $I_{eff\_set}$.

In this example and its various variants, it is of course possible to apply the voltage-saturation block B_SAT to the power setpoint value $P_{set}$. This is expressed by the following relationship:

$$P'_{set\_i} = (P_{set}, V_{crête\_1,2,3})$$

Other Variant Embodiments

As described previously, the RMS-current setpoint of the configuration of FIG. 6A or 6B may be limited by taking into account other parameters, such as for example:
the temperature of the cells used in each battery pack;
the time of use of the cells present in each battery pack;
the maximum current that the cells of a battery pack are able to withstand depending on their state (state of charge SOC, their state of health, their aging, their internal resistance, etc.). For example, the higher the current flowing through a cell, the greater the voltage drop associated with the internal resistance of the cell. This voltage drop may cause the operating voltage of a cell to fall to its lower limit and the system may as a result no longer use this cell. Adjusting the current setpoint allows the operation of the cells of the battery packs to be optimized depending on the desired performance; a lower setpoint therefore allows maximum use to be made of the charge of the cells, or a setpoint that is "not decreased" allows operation of the system supplied with power to be optimized.

Figure 8:
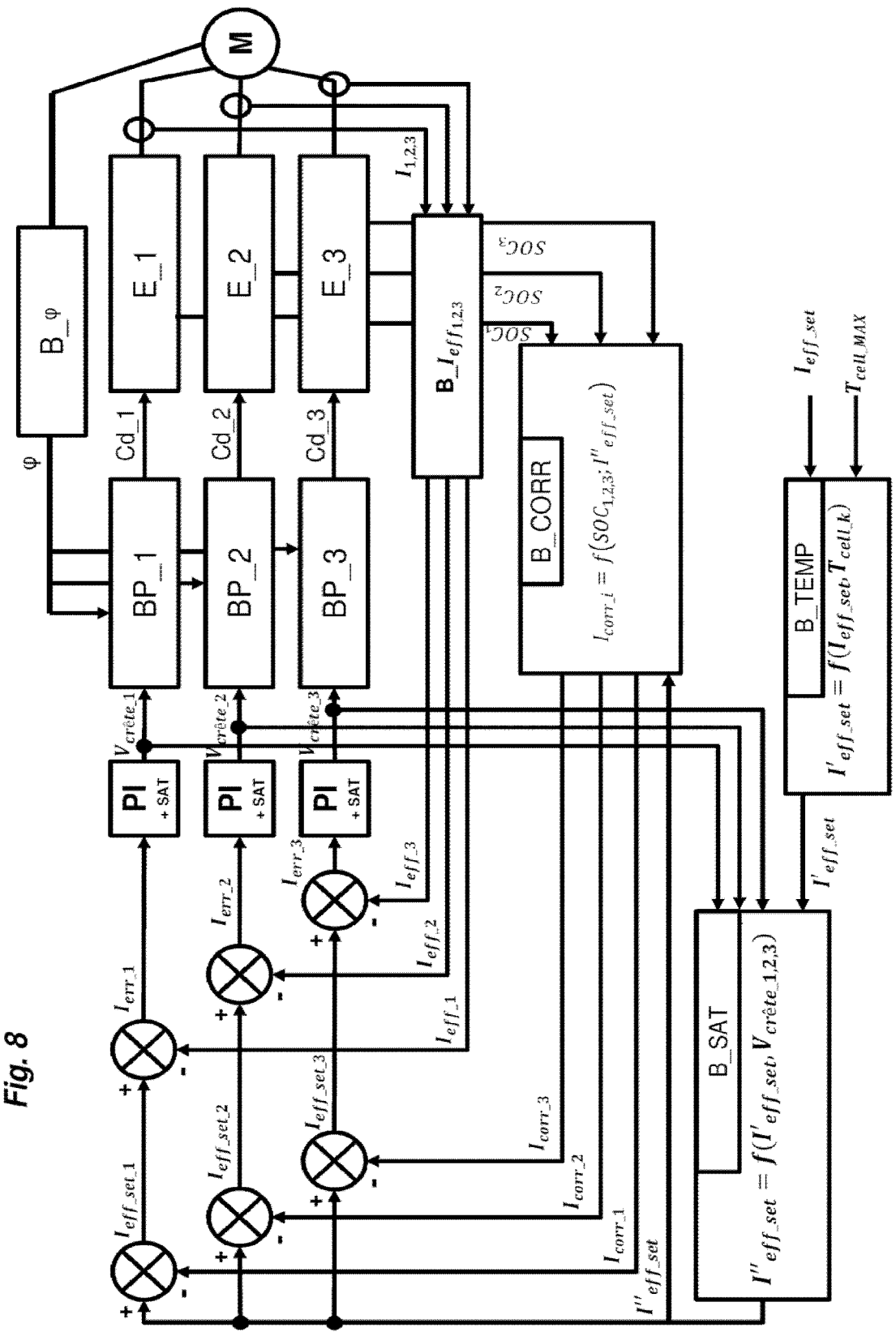

FIG. 8 thus illustrates the principle of the correction of the setpoint value depending on a parameter that is additional to that already used in the correction block (state parameter $ST_i$ such as the state of charge $SOC_i$). In this example, it is a question of also taking into account the temperature $T_{cell\_k}$ of the cells of the battery packs, by determining/measuring the temperatures of all the cells of the three battery packs and by choosing for example the one that has the highest value. This highest temperature value, among all those of the cells, is injected into a setpoint-saturation control block B_TEMP, which takes this maximum value $T_{cell\_MAX}$ into account. This saturation control block applies the following relationship:

$$I'_{eff\_set} = f(I_{eff\_set}, T_{cell\_MAX})$$

As a variant, rather than the highest temperature, it is possible to take into account the average temperature of all the cells, or the highest temperature among the three average temperatures determined for the three battery packs.

Figure 9:
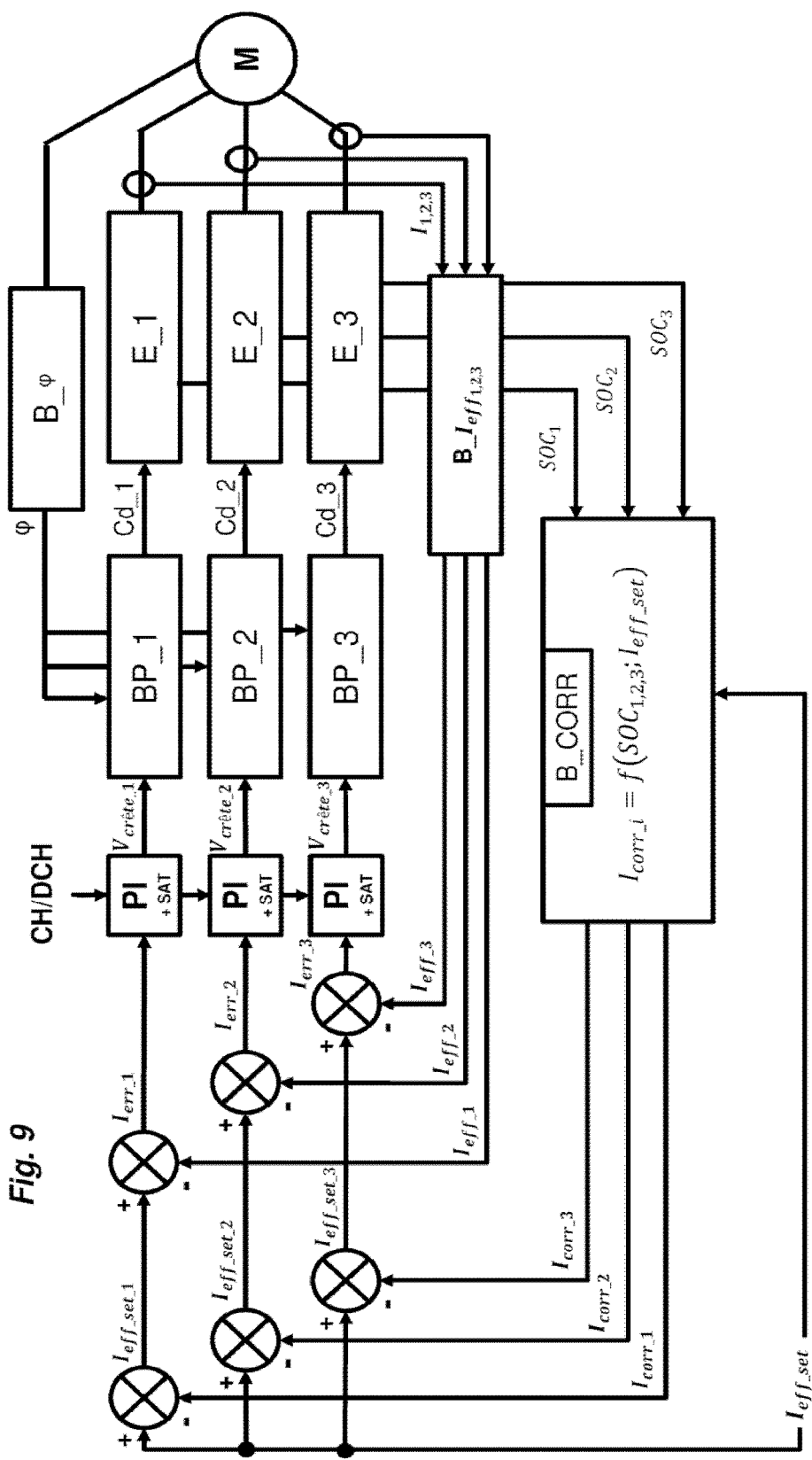
Figure 10:
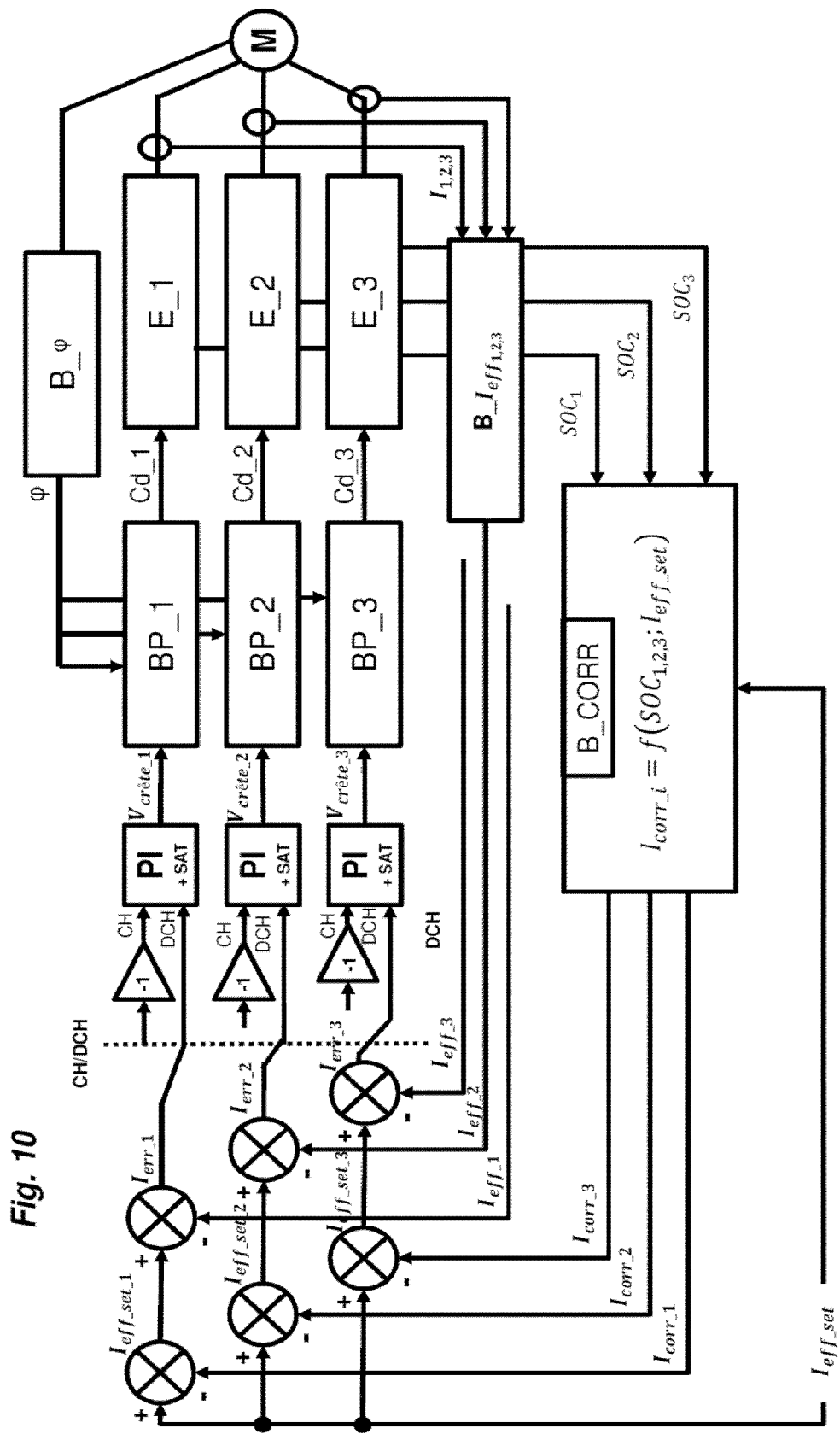
Figure 11:
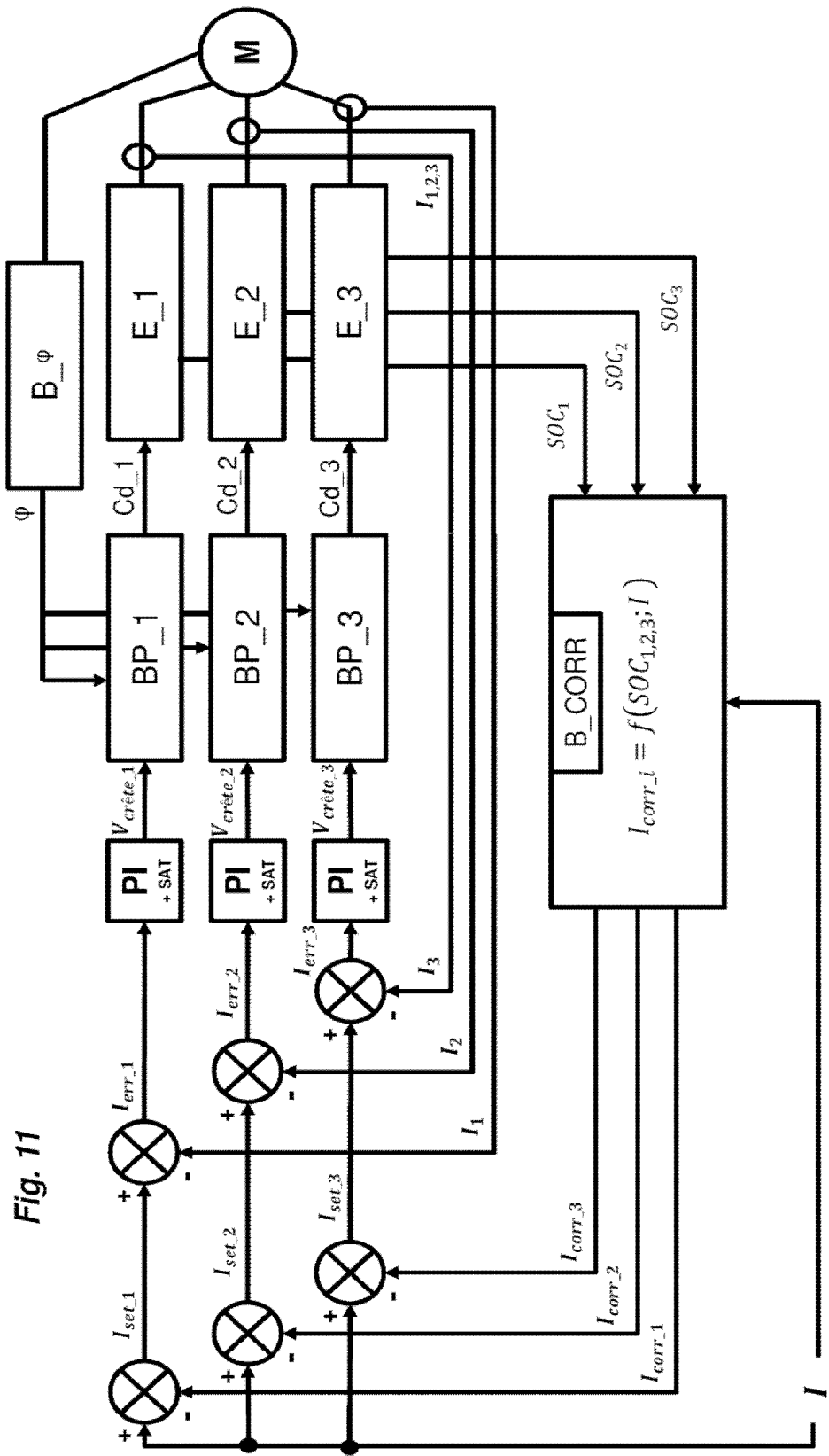

Variant embodiments are also shown in FIGS. 9 to 11. They allow the charge of the battery packs to be taken into account. Specifically, the use of an RMS-current setpoint means that the setpoint is by definition always positive and does not allow the cases of charging and discharging to be differentiated between.

In FIG. 9, an additional input, referenced CH/DCH (for charge or discharge) is incorporated into the system, in order to distinguish between charging and discharging. The method comprises a step of reading this additional input.

In this example, in case of charging, the electric machine will be a three-phase electric generator and each battery pack must synchronize to the voltage of the corresponding phase. By seeking to decrease the voltage across each battery pack with respect to the voltage that the generator would deliver unloaded, each battery pack may regulate its charging current. The input CH/DCH is applied to the PI correctors of the current regulation loop. It will be in CH (charging) mode and the RMS-current setpoint will be an RMS charging current, or in DCH (discharging) mode and the RMS-current setpoint will be an RMS discharging current.

As shown in FIG. 10, alternatively to the input CH/DCH added to the PI correctors, the system may multiply by −1 the errors input into the three PI correctors ($I_{err\_1}$, $I_{err\_2}$, $I_{err\_3}$) of the current regulation loop, in the case where the system is charging, and leave them unchanged in the case of discharging.

In the variants of FIGS. 9 and 10, the other blocks, already described above, remain unchanged.

In the variant embodiment of FIG. 11, the current setpoint value I and all the other current values $I_1$, $I_2$, $I_3$ have a signed value. The sign of the measured currents is directly related to the fact that the measured current is in phase or in phase opposition with the voltage applied to the motor. This signed setpoint therefore allows both charging and discharging to be managed. It input into the system and it is common to the three phases.

Figure 12:
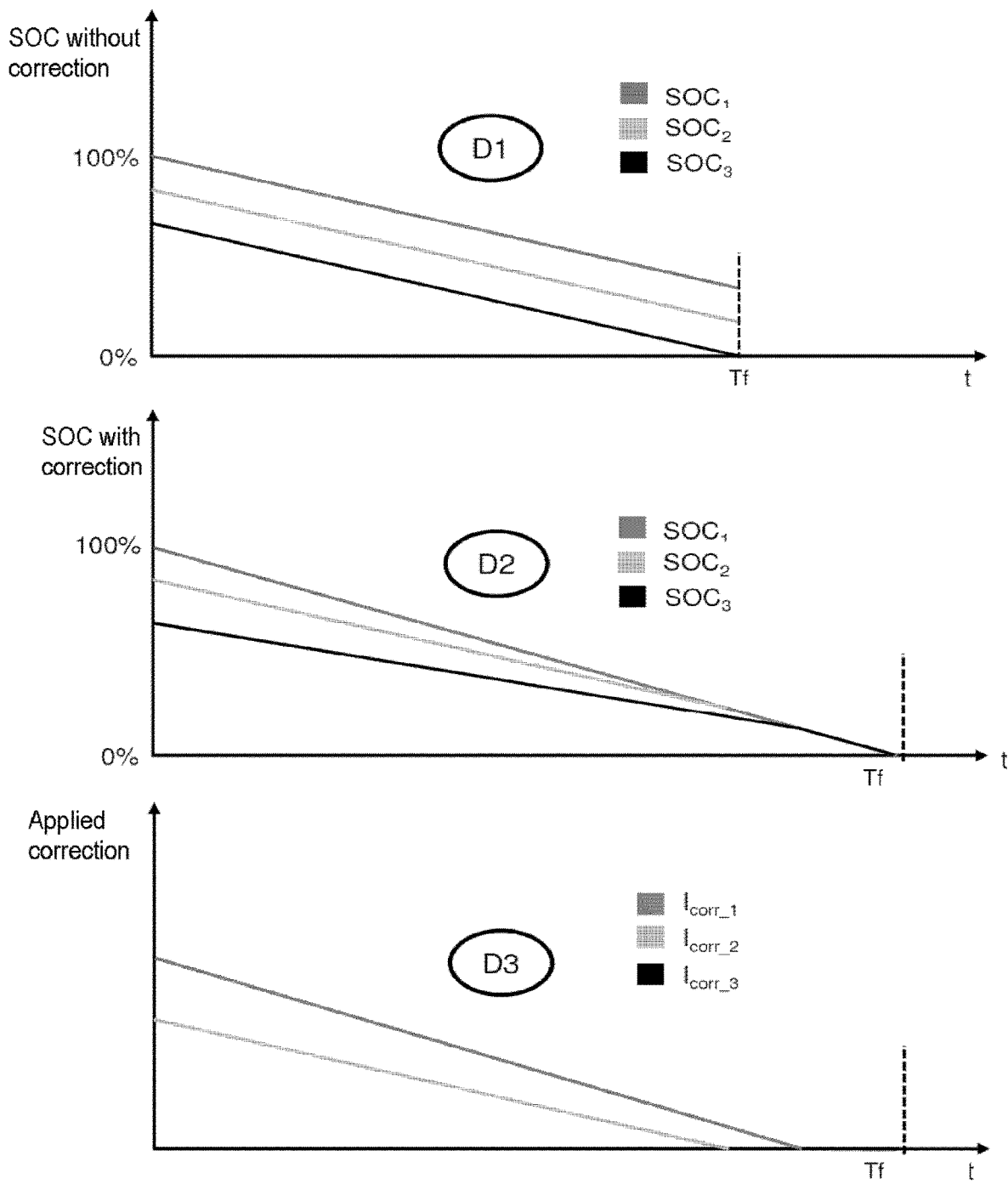
FIGS. 12 and 13 show graphs illustrating the operating principle of the invention.
Figure 13:
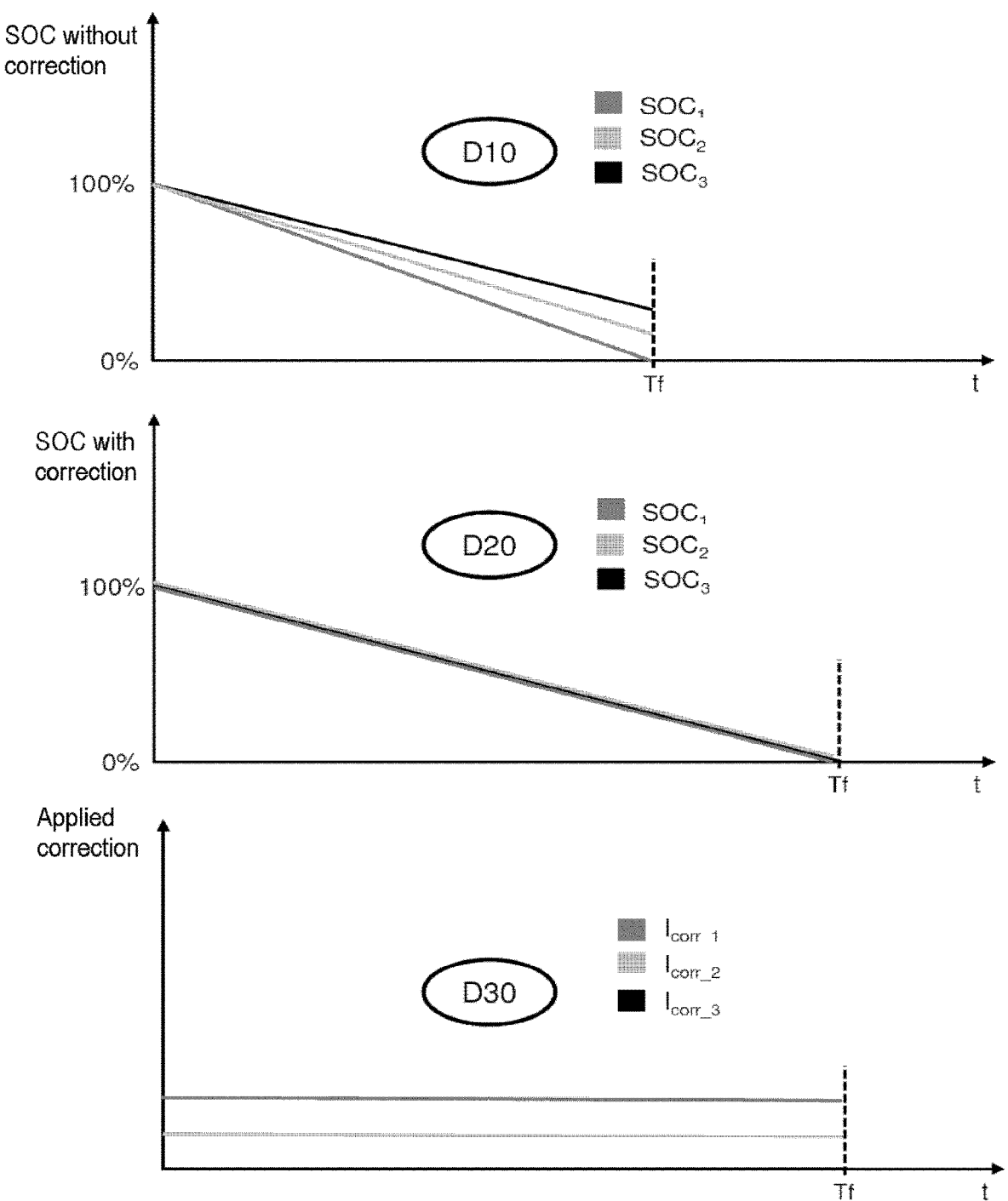

FIGS. 12 and 13 make it possible to illustrate the operating principle of the invention, whatever the control diagram employed.

By way of example, with respect to the configuration of FIG. 6A, and for operation in discharge mode, the following two particular cases are analyzed.

In the first case, shown in FIG. 12, the three battery packs are initially charged to different SOC levels ($SOC_1$, $SOC_2$, $SOC_3$). In the absence of correction (i.e. without the correction block B_CORR described above), the discharge ends (at Tf) when the first battery pack has completely discharged, even if the other two battery packs have not yet completely discharged (first graph D1 in FIG. 12). With the correction block B_CORR of the invention, as may be seen in graph D2, the various states of charge $SOC_i$ of the three battery packs converge during discharge so as to be all completely discharged at Tf. This allows all the battery packs to be completely discharged and therefore all of the energy that was stored in the three battery packs to be used, this increasing the battery life of the system. Graph D3 shows the corrections applied to the setpoint values (in current mode in this example, but the principle remains valid also for the voltage and power setpoint values in the configurations described above).

In the second case, shown in FIG. 13, the three battery packs are initially charged with the same state of charge $SOC_i$, but they are used in an unbalanced way. For example, the motor M connected to the battery packs consumes different currents via the three phases or else the three battery packs have a different state of health (SOH) (i.e. a different capacity). In the absence of correction (i.e. without the correction block B_CORR described above), as may be seen in graph D10, an increasingly large difference appears between the charge levels of the three battery packs and the discharge ends at Tf when the first battery pack has completely discharged even though the other two battery packs have not yet completely discharged. With the correction block B_CORR of the invention, as may be seen in graph D20, the states of charge $SOC_i$ of the 3 battery packs remain balanced throughout the discharge, right up to Tf. This allows all the battery packs to be completely discharged and therefore all of the energy stored in the three battery packs to be used, this increasing the battery life of the system. Just like graph D3, graph D30 shows the corrections applied to the current setpoint values (the principle remains valid also for voltage and power setpoint values).

It will be understood from the above that the solution of the invention has many advantages, among which:
- it allows a balance to be maintained between the states of the battery packs in a power-supply topology of an electric machine such as that of FIG. 2;
- it is simple to implement because it uses data already available in the normal operating mode of the control of the electric machine;
- it adapts to any situation, notably whatever the type (current, voltage or power) of setpoint value used;
- it is able to take into account a set of battery-pack monitoring parameters, such as for example the state of charge of the battery pack, the state of health of the cells, the internal resistance of the cells, etc.
- it allows both the battery life of the power-supply device to be increased and its lifespan to be extended.

The invention claimed is:

1. A control method for controlling an electric-power-supply device for supplying electric power to a multi-phase electrical system, said device comprising at least one separate electric-power-supply assembly per phase of said electrical system, each electric-power-supply assembly comprising at least one battery pack defined by a state parameter and equipped with at least one battery intended to deliver a control voltage to the phase of the electrical system to which each electric-power-supply assembly is connected, while taking into account at least one setpoint value, the method comprising:
  executing at least one correction block that receives, as input, each setpoint value and the state parameter of each battery pack of the electric-power-supply assemblies of the system; and
  for each electric-power-supply assembly, determining, by said correction block, a correction value to be applied directly or indirectly to the setpoint value of the electric-power-supply assembly, while taking into account the difference between the value of the state parameter of the battery pack and the value of an optimal state parameter determined from the values of the state parameters of the battery packs of all the electric-power-supply assemblies.

2. The method as claimed in claim 1, wherein, for each electric-power-supply assembly, the state parameter of the battery corresponds to at least one of a state of charge, a temperature, an internal resistance, a state of health, and a charging capacity of the battery.

3. The method as claimed in claim 1, wherein, for each electric-power-supply assembly, said setpoint value is corrected according to the following principle:

$$X_{corr\_i} = X_{set} * \left(1 - \frac{ST_i}{ST_{OPT}}\right)$$

where:
- $ST_i$ corresponds to the value of the state parameter of the battery pack of the power-supply assembly i;
- $ST_{OPT}$ corresponds to the optimal value of the three state-parameter values;
- $X_{corr\_i}$ corresponds to the correction value to be applied to the setpoint value of the electric-power-supply assembly i; and
- $X_{set}$ corresponds to the setpoint value to be applied to the electric-power-supply assembly i.

4. The method as claimed in claim 1, wherein, for each electric-power-supply assembly, said setpoint value is corrected according to the following principle:

$$X_{corr\_i} = X_{set} * K * \left(1 - \frac{ST_i}{ST_{OPT}}\right)$$

where:
- $ST_i$ corresponds to the value of the state parameter of the battery pack of the power-supply assembly i;
- $ST_{OPT}$ corresponds to the optimal value of the three state-parameter values;
- $X_{corr\_i}$ corresponds to the correction value to be applied to the setpoint value of the electric-power-supply assembly i;
- $X_{set}$ corresponds to the setpoint value to be applied to the electric-power-supply assembly i; and
- K corresponds to a weighting coefficient.

5. The method as claimed in claim 1, wherein, for each electric-power-supply assembly, said setpoint value is corrected by implementing a regulation loop with an integral corrector, a proportional-integral corrector or a proportional-integral-derivative corrector, said loop being configured to gradually decrease to zero the differences in the state parameter between the electric-power-supply assemblies.

6. The method as claimed in claim 1, wherein the setpoint value is a peak-voltage value.

7. The method as claimed in claim 1, wherein the setpoint value is an RMS-current value.

8. The method as claimed in claim 7, further comprising executing a current regulation loop configured to determine each RMS-current setpoint value from the values of the currents measured on each phase of the electrical system.

9. The method as claimed in claim 1, wherein the setpoint value is an electrical power.

10. The method as claimed in claim 9, further comprising determining a current setpoint value from the power setpoint value and from the voltages measured on the phases of the electrical system.

11. The method as claimed in claim 1, wherein the setpoint value is identical for all the power-supply assemblies.

12. The method as claimed in claim 1, further comprising executing a voltage-saturation control block configured to determine a corrected setpoint value, taking into account the control voltages to be applied by each power-supply assembly and each setpoint value, wherein said determined corrected setpoint value becomes the setpoint value input into said correction block.

13. The method as claimed in claim 1, further comprising reading an input parameter representative of a charging mode or of a discharging mode of each battery pack.

14. A control system for controlling an electric-power-supply device for supplying electric power to a multi-phase electrical system, said device comprising at least one separate electric-power-supply assembly per phase of said electrical system, each electric-power-supply assembly comprising at least one battery pack defined by a state parameter and equipped with at least one battery intended to deliver a control voltage to the phase of the electrical system to which each electric-power-supply assembly is connected, while taking into account at least one setpoint value, wherein said system comprises:
- at least one correction block that receives, as input, each setpoint value and the state parameter of each battery pack of the electric-power-supply assemblies of the system, wherein
- for each electric-power-supply assembly, said at least one correction block is configured to determine a correction value to be applied directly or indirectly to the setpoint value of the electric-power-supply assembly, while taking into account the difference between the value of the state parameter of the battery pack and the value of an optimal state parameter determined from the values of the state parameters of the battery packs of all the electric-power-supply assemblies.

15. An electric-power-supply device for supplying electric power to a multi-phase electrical system, said device comprising at least one separate electric-power-supply assembly per phase of said electrical system, each electric-power-supply assembly comprising at least one battery pack defined by a state parameter and equipped with at least one battery to deliver a control voltage to the phase of the electrical system to which each electric-power-supply assembly is connected, while taking into account at least one setpoint value, wherein said electric-power-supply device includes a control system as defined in claim 14, to control each electric-power-supply assembly of the device so as to obtain a complete charge or a complete discharge of all the battery packs simultaneously.

\* \* \* \* \*